US008594903B2

(12) United States Patent
Feeney et al.

(10) Patent No.: US 8,594,903 B2
(45) Date of Patent: Nov. 26, 2013

(54) METHOD OF MONITORING GAS TURBINE ENGINE OPERATION

(75) Inventors: Mark Edward Feeney, Candiac (CA); Keith John Leslie, Greenfield Park (CA); Yusuf Razi Syed, Mississauga (CA); Simon John Hartropp, Pointe Claire (CA)

(73) Assignee: Pratt & Whitney Canada Corp., Longueuil (CA)

( * ) Notice: Subject to any disclaimer, the term of this patent is extended or adjusted under 35 U.S.C. 154(b) by 156 days.

(21) Appl. No.: 12/344,885

(22) Filed: Dec. 29, 2008

(65) Prior Publication Data

US 2009/0229272 A1 Sep. 17, 2009

Related U.S. Application Data

(62) Division of application No. 10/850,436, filed on May 21, 2004, now Pat. No. 7,487,029.

(51) Int. Cl.
*G06F 19/00* (2011.01)

(52) U.S. Cl.
USPC ........... 701/100; 123/299; 251/117; 251/118; 701/29.4; 701/31.4; 701/31.9; 701/33.9; 702/183; 415/17

(58) Field of Classification Search
USPC .......... 701/100, 207, 31.4, 31.9; 60/778–779; 382/217–218; 73/112.01, 1.79, 112; 340/945, 963; 702/183–184; 123/299; 251/117–118; 415/17
See application file for complete search history.

(56) References Cited

U.S. PATENT DOCUMENTS

| | | | | |
|---|---|---|---|---|
| 3,583,661 | A | 6/1971 | Stake | |
| 3,709,033 | A | 1/1973 | Pollitt | |
| 3,762,667 | A * | 10/1973 | Pender | 244/7 A |
| 3,851,464 | A | 12/1974 | Davis et al. | |
| 3,871,444 | A | 3/1975 | Houser et al. | |
| 3,880,226 | A | 4/1975 | Houser et al. | |
| 4,028,884 | A * | 6/1977 | Martz et al. | 60/39.182 |
| 4,046,003 | A | 9/1977 | Armstrong et al. | |
| 4,215,412 | A * | 7/1980 | Bernier et al. | 701/100 |
| 4,402,561 | A * | 9/1983 | Grabbe et al. | 439/66 |
| 4,428,199 | A * | 1/1984 | Moore et al. | 60/600 |

(Continued)

FOREIGN PATENT DOCUMENTS

| | | |
|---|---|---|
| CA | 948881 | 6/1974 |
| CH | 556028 | 11/1974 |

(Continued)

OTHER PUBLICATIONS

Estimation of multiple faults in aircraft gas-turbine engines; Sarkar, S.; Rao, C.; Ray, A.; American Control Conference, 2009. ACC '09. Digital Object Identifier: 10.1109/ACC.2009.5159981; Publication Year: 2009 , pp. 216-221.*

(Continued)

*Primary Examiner* — Cuong H Nguyen
(74) *Attorney, Agent, or Firm* — Norton Rose Fulbright Canada LLP

(57) ABSTRACT

A system, method and apparatus for monitoring the performance of a gas turbine engine. A counter value indicative of the comparison between the engine condition and the threshold condition is adjusted. The aircraft operator is warned of an impending maintenance condition based on the counter value and determines an appropriate course of action.

7 Claims, 2 Drawing Sheets

(56) References Cited

U.S. PATENT DOCUMENTS

| | | | | |
|---|---|---|---|---|
| 4,500,966 | A * | 2/1985 | Zagranski et al. | 701/116 |
| 4,583,360 | A | 4/1986 | Nick | |
| 4,590,562 | A | 5/1986 | Zwicke et al. | |
| 4,783,957 | A | 11/1988 | Harris | |
| 4,787,053 | A * | 11/1988 | Moore | 701/123 |
| 4,798,515 | A * | 1/1989 | Hsia et al. | 415/115 |
| 4,904,999 | A | 2/1990 | Klansnic et al. | |
| 5,018,069 | A | 5/1991 | Pettigrew | |
| 5,033,010 | A | 7/1991 | Lawrence et al. | |
| 5,047,942 | A | 9/1991 | Middleton et al. | |
| 5,309,379 | A | 5/1994 | Rawlings et al. | |
| 5,372,426 | A | 12/1994 | Broudy et al. | |
| 5,390,125 | A * | 2/1995 | Sennott et al. | 701/214 |
| 5,437,539 | A | 8/1995 | Gysling et al. | |
| 5,479,350 | A | 12/1995 | Barakchi et al. | |
| 5,488,833 | A | 2/1996 | Stewart | |
| 5,555,503 | A * | 9/1996 | Kyrtsos et al. | 701/207 |
| 5,636,507 | A * | 6/1997 | Rajamani et al. | 60/773 |
| 5,638,272 | A | 6/1997 | Minowa et al. | |
| 5,726,891 | A | 3/1998 | Sisson et al. | |
| 5,919,267 | A | 7/1999 | Urnes et al. | |
| 6,105,928 | A * | 8/2000 | Ise et al. | 251/61.2 |
| 6,112,141 | A * | 8/2000 | Briffe et al. | 701/14 |
| 6,164,057 | A * | 12/2000 | Rowen et al. | 60/39.27 |
| 6,199,372 | B1 * | 3/2001 | Wakamoto | 60/274 |
| 6,202,403 | B1 | 3/2001 | Laborie et al. | |
| 6,226,597 | B1 | 5/2001 | Eastman et al. | |
| 6,341,238 | B1 * | 1/2002 | Modeen et al. | 700/66 |
| 6,346,892 | B1 | 2/2002 | DeMers et al. | |
| 6,408,259 | B1 * | 6/2002 | Goebel et al. | 702/183 |
| 6,487,478 | B1 | 11/2002 | Azzaro et al. | |
| 6,741,203 | B1 * | 5/2004 | Woodell | 342/26 B |
| 6,748,325 | B1 * | 6/2004 | Fujisaki | 701/301 |
| 6,769,404 | B2 * | 8/2004 | Aoyama et al. | 123/406.29 |
| 6,789,000 | B1 * | 9/2004 | Munson, Jr. | 700/287 |
| 6,945,030 | B2 * | 9/2005 | Hirayama et al. | 60/39.27 |
| 7,027,808 | B2 | 4/2006 | Wesby | |
| 7,129,857 | B1 * | 10/2006 | Spirkovska | 340/971 |
| 7,207,213 | B2 * | 4/2007 | Gerhardt et al. | 73/112.01 |
| 7,307,549 | B2 * | 12/2007 | Firra | 340/974 |
| 7,487,029 | B2 * | 2/2009 | Feeney et al. | 701/100 |
| 2001/0045201 | A1 * | 11/2001 | Yoshizawa et al. | 123/299 |
| 2002/0092488 | A1 * | 7/2002 | Aoyama et al. | 123/90.16 |
| 2002/0193920 | A1 | 12/2002 | Miller et al. | |
| 2003/0003872 | A1 | 1/2003 | Brinkley et al. | |
| 2003/0083825 | A1 | 5/2003 | Berndorfer | |
| 2003/0187554 | A1 | 10/2003 | Henry et al. | |
| 2004/0016236 | A1 | 1/2004 | Walker | |
| 2004/0055273 | A1 * | 3/2004 | Hirayama et al. | 60/39.281 |
| 2004/0244633 | A1 | 12/2004 | Witmer | |
| 2005/0069207 | A1 * | 3/2005 | Zakrzewski et al. | 382/190 |
| 2005/0114010 | A1 * | 5/2005 | Healy et al. | 701/100 |
| 2005/0222933 | A1 | 10/2005 | Wesby | |
| 2005/0261820 | A1 * | 11/2005 | Feeney et al. | 701/100 |
| 2006/0280556 | A1 | 12/2006 | Gerhardt et al. | |
| 2007/0008188 | A1 | 1/2007 | Firra | |

FOREIGN PATENT DOCUMENTS

| | | |
|---|---|---|
| EP | 0666423 | 8/1995 |
| EP | 1154237 | 11/2001 |
| FR | 2149797 | 3/1973 |

OTHER PUBLICATIONS

Symbolic identification for anomaly detection in aircraft gas turbine engines; Chakraborty, S.; Sarkar, S.; Ray, A.; Phoha, S.; American Control Conference (ACC), 2010; Publication Year: 2010 , pp. 5954-5959.*

Anomaly detection for health management of aircraft gas turbine engines; Tolani, D.; Yasar, M.; Shin Chin; Ray, A.; American Control Conference, 2005. Proceedings of the 2005; Digital Object Identifier: 10.1109/ACC.2005.1469978; Publication Year: 2005 , pp. 459-464 vol. 1.*

Thermophysical problems of the application freezing fuels for the aircraft gas-turbine engines (AGTE); Janovsky, L.S. et al..; Energy Conversion Engineering Conference, 1996. IECEC 96. Proceedings of the 31st Intersociety ; vol. 1; Digital Object Identifier: 10.1109/IECEC.1996.552857; Publication Year: 1996; pp. 125-126 vol. 1.*

Life extending control of gas turbine engines for aircraft propulsion; Caplin, J.; Ray, A.; Decision and Control, 1997., Proceedings of the 36th IEEE Conference on; vol. 5 ; Digital Object Identifier: 10.1109/CDC.1997.649743 Publication Year: 1997 , pp. 4700-4701 vol. 5.*

High temperature passive components for commercial and military applications; Grzybowski, R.R.; Energy Conversion Engineering Conference, 1997. IECEC-97., Proceedings of the 32nd Intersociety; vol. 1; Digital Object Identifier: 10.1109/IECEC.1997.659275; Publication Year: 1997 , pp. 699-704 vol. 1.*

Decentralised multivariable control and stability of a gas turbine engine; Perez, R.A.; Lou, K.-N.; Control Theory and Applications, IEE Proceedings—vol. 141 , Issue: 6; Digital Object Identifier: 10.1049/ip-cta:19941498 Publication Year: 1994 , pp. 357-366.*

Prognosis of faults in gas turbine engines; Brotherton, T.; Jahns, G.; Jacobs, J.; Wroblewski, D.; Aerospace Conference Proceedings, 2000 IEEE; vol. 6; Digital Object Identifier: 10.1109/AERO.2000.877892; Publication Year: 2000 , pp. 163-171 vol. 6.*

Anomaly detection for health management of aircraft gas turbine engines; Tolani, D.; Yasar, M.; Shin Chin; Ray, A.; American Control Conference, 2005. Proceedings of the 2005; Digital Object Identifier: 10.1109/ACC.2005.1469978 Publication Year: 2005 , pp. 459-464 vol. 1.*

Fault diagnosis and isolation in aircraft gas turbine engines; Sarkar, S.; Mukherjee, K.; Ray, A.; Yasar, M.; American Control Conference, 2008; Digital Object Identifier: 10.1109/ACC.2008.4586813 Publication Year: 2008 , pp. 2166-2171.*

Bayesian belief networks for fault identification in aircraft gas turbine engines; Mast, T.A.; Reed, A.T.; Yurkovich, S.; Ashby, M.; Adibhatla, S.; Control Applications, 1999. Proceedings of the 1999 IEEE International Conference on; vol. 1 Digital Object Identifier: 10.1109/CCA.1999.806140; Publication Year: 1999 , pp. 39-44 vol. 1.*

On optimization of sensor selection for aircraft gas turbine engines; Mushini, R.; Simon, D.; Systems Engineering, 2005. ICSEng 2005. 18th International Conference on; Digital Object Identifier: 10.1109/ICSENG.2005.61; Publication Year: 2005 , pp. 9-14.*

Two degree of freedom motion control of an energy optimized aircraft ram air inlet actuator; Bajcinca, N.; Schurmann, N.; Bals, J. Control and Automation, 2005. ICCA '05. International Conference on; vol. 2;Digital Object Identifier: 10.1109/ICCA.2005.1528235; Publication Year: 2005 , pp. 818-821 vol. 2.*

Fuzzy Controller for a Gas Turbine Plant; Rangaswamy, T.R. ; Shanmugam, J. ; Thyagarajan, T.; Industrial Technology, 2006. ICIT 2006. IEEE International Conference on; Digital Object Identifier: 10.1109/ICIT.2006.372513; Publication Year: 2006 , pp. 1252-1257.*

REACTS: reliable electrical actuation systems; Dixon, R. ; Gifford, N. ; Sewell, C. ; Spalton, M.C.; Electrical Machines and Systems for the More Electric Aircraft (Ref. No. 1999/180), IEE Colloquium on; Digital Object Identifier: 10.1049/ic:19990834 Publication Year: 1999 , pp. 5/1-516.*

Experimental characterization of immersion-cooled devices at elevated ambient temperatures; Lenke, Robert U.; Christoph, Martin; De Doncker, Rik W.; Power Electronics Specialists Conference, 2008. PESC 2008. IEEE; Jun. 15-19, 2008 pp. 493-497; Digital Object Identifier 10.1109/PESC.2008.4591977.*

Breakdown behavior of SF6 gas-insulated systems at low temperature: Frechette, M.F.; Roberge, D.; Larocque, R.Y.; Dielectrics and Electrical Insulation, IEEE Transactions on [see also Electrical Insulation, IEEE Transactions on] vol. 2, Issue 5, Oct. 1995 pp. 925-951; Digital Object Identifier 10.1109/94.469987.*

Breakdown behavior of SF6 gas-insulated systems at low temperature; Frechette, M.F.; Roberge, D.; Larocque, R.Y.; Dialelectrics and Electrical Insulation, IEEE Transactions on [see also Electrical Insulation, IEEE Transactions on; vol. 2, Issue 5, Oct. 1995 pp. 925-951; Digital Object Identifier 10.1109/94.469987.

Experimental characterization of immersion-cooled devices at elevated ambient temperatures; Lenke, Robert U.; Christoph, Martin;

(56) References Cited

OTHER PUBLICATIONS

De Doncker, Rik W.; Power Electronics Specialists Conference, 2008. PESC 2008. IEEE; Ju. 15-19, 2008 pp. 493-497; Digital Object Identifier 10.1109/PESC.2008.4591977.

The performance of beta particles sensitivity controlled open air corona streamer counter in humid air; Fouad, L.; El-Hazek, S.; Industry Applications Conference, 1996. Thirty-First IAS Annual Meeting, IAS '96., Conference Record of the 1996 IEEE vol. 4, Oct. 6-10, 1996 pp. 2048-2053 vol. 4; Digital Object Identifier 10.1109/IAS.1996.563856.

Unapproved IEEE Draft Recommended Practice for Inertial Sensor Test Equipment, Instrumentation, Data Acquisition, and Analysis Supserseded by the approved draft; 2004.

IEEE Recommended Practice for Inertial Sensor Test Equipment, Instrumentation, Data Acquisition, and Analysis 2005 pp. 0_1-103.

Draft Recommended Practice for Inertial Sensor Test Equipment, Instrumentation, Data Acquisition, and Analysis 2005.

Use of scanned detection in optical position encoders; Yeatman, E.M.; Kushner, P.J.; Roberts, D.A.; Instrumentation and Measurement, IEEE Transactions on; vol. 53, Issue 1, Feb. 2004 pp. 37-44; Digital Object Identifier 10.1109/ TIM.2003.821502.

* cited by examiner

METHOD OF MONITORING GAS TURBINE ENGINE OPERATION

CROSS REFERENCE TO RELATED APPLICATIONS

This application is a division of U.S. patent application Ser. No. 10/850,436, filed 21 May 2004 now issued as U.S. Pat. No. 7,487,029 and entitled Method of Monitoring Gas Turbine Engine Operation, the entire contents of which are incorporated herein by this reference.

FIELD OF THE INVENTION

The invention relates to the field of engine health and trend monitoring, and in particular to applications related to aircraft engines.

BACKGROUND OF THE INVENTION

Engine health and trend monitoring typically involves the recording and monitoring of engine parameters, and subsequent monitoring and analysis of such parameters in an attempt to determine engine operating trends, and particularly those which may be indicative of an engine condition requiring maintenance. Some sophisticated systems include apparatus to upload engine data, upon aircraft arrival at its destination, to remote monitoring sites to provide on-going oversight of engine performance. Such systems, however, require significant equipment and infrastructure in support, and typically provide the operator with little real time information on engine health.

SUMMARY OF THE INVENTION

According to a first broad aspect of the present invention, there is provided a method of monitoring the performance of an aircraft-mounted gas turbine engine. The method comprises the steps of sensing at least one engine condition; comparing the engine condition against a predetermined threshold condition; adjusting a counter value indicative of the comparison between the engine condition and the threshold condition, wherein the adjustment includes incrementing the counter value if the engine condition and the threshold condition meet at least a first criterion and decrementing the counter value if the engine condition and the threshold condition meet at least a second criterion; comparing the counter value to a predetermined maximum counter value; setting a warning flag indicative of an impending maintenance condition when the counter value meets at least a third criterion based on the comparison with the predetermined maximum counter value; and indicating to an operator of the aircraft that the warning flag has been set.

In another embodiment of the invention, there is provided a method of extending operation of an aircraft-mounted gas turbine engine. The method comprises the steps of monitoring a temperature of the engine; counting at least occurrences of a threshold temperature exceedance and occurrences of a threshold temperature non-exceedance; when a predetermined count value is achieved, selecting an aircraft flight plan to provide a cool operating environment which thereby extends permissible operation period of the engine before a next engine maintenance event is required.

According to another broad aspect of the present invention, there is provided a method of extending operation of an aircraft-mounted gas turbine engine. The method comprises the steps of monitoring a temperature of the engine; counting at least occurrences of a threshold temperature exceedance and occurrences of a threshold temperature non-exceedance; when a predetermined count value is achieved, selecting an aircraft flight plan to provide a cool operating environment which thereby extends permissible operation period of the engine before a next engine maintenance event is required.

According to another broad aspect of the present invention, there is provided a system for monitoring the performance of an aircraft-mounted gas turbine engine. The system comprises a sensor to monitor an engine parameter and detect a difference in the engine parameter between an actual value and an expected value; a counter to keep track of a counter value based on engine parameter actual-expected difference sensed; a comparator to compare the counter value to a warn point corresponding to an at-limit point corresponding to the engine parameter, where the warn point is different than the at-limit point and to set a warning flag indicative of an impending maintenance condition when the counter value meets at least a first criterion based on the comparison; and an indicator to advise an operator of the aircraft that the warning flag has been set.

According to yet another broad aspect of the present invention, there is provided an apparatus for monitoring the performance of an aircraft-mounted gas turbine engine. The apparatus comprises an input for receiving an engine parameter; computing means for detecting a difference in the engine parameter between an actual value and an expected value; a memory to keep track of a counter value based on engine parameter actual-expected difference sensed; the computing means for further comparing the counter value to a warn point corresponding to an at-limit point corresponding to the engine parameter, where the warn point is different than the at-limit point and for setting a warning flag indicative of an impending maintenance condition when the counter value meets at least a first criterion based on the comparison; and an output for indicating to an operator of the aircraft that the warning flag has been set.

BRIEF DESCRIPTION OF THE DRAWINGS

These and other features, aspects and advantages of the present invention will become better understood with regard to the following description and accompanying drawings wherein.

DETAILED DESCRIPTION OF THE INVENTION

Figure 1:
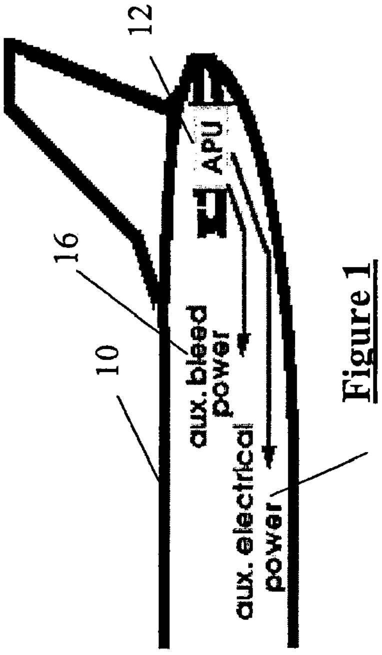
FIG. 1 is a schematic representation of an aircraft including an embodiment of the present invention.

A preferred embodiment of the present invention is described with reference to FIGS. 1 to 3. Referring to FIG. 1, in this embodiment, an auxiliary power unit (APU) 12 is mounted on an aircraft 10 for conventional purposes, including the provision of electrical power 14 and pneumatic air 16 to the aircraft. Among other well-known uses, pneumatic air provided by the APU is used on larger aircraft to provide auxiliary bleed air for starting the aircraft's main engines.

As is understood by the skilled reader, adjustable inlet guide vanes (or IGVs) control the flow of outside air to the APU load compressor, and the IGV angle is generally adjusted depending on bleed air demand. However, in hotter operating environments (i.e., where airport temperatures are high), the hotter environment of course strains cooling requirements on the aircraft and decreases engine operating efficiencies. When temperatures rise above a certain threshold or reference point, typically IGV angle is reduced in order to maintain priority for the provision electrical power by the APU. As the effect of temperature and APU deterioration progress, the IGV angle is continually decreased. One danger presented to the aircraft main engines is that, if IGV angle is decreased too much, eventually the decreased IGV angle will negatively impact the main engine start pressure and flow to the aircraft main engines, and could therefore cause problems in starting or perhaps even main engine damage, such as by "over-temping" them, i.e., causing main engine temperatures to exceed desired limits.

Figure 2:
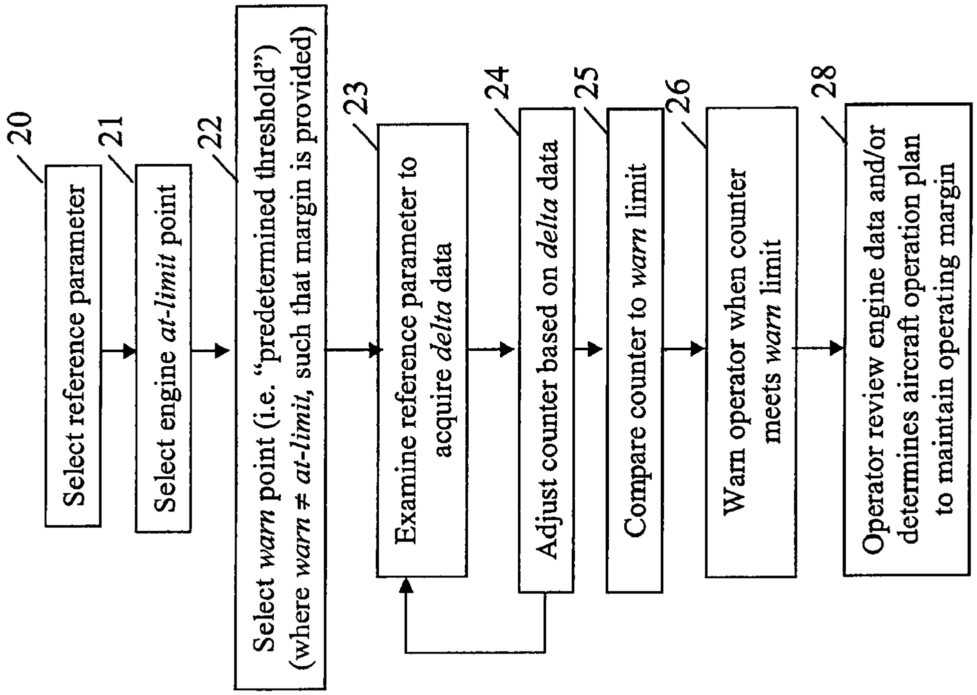
FIG. 2 is a flow chart of a method according an embodiment of the present invention.
Figure 3:
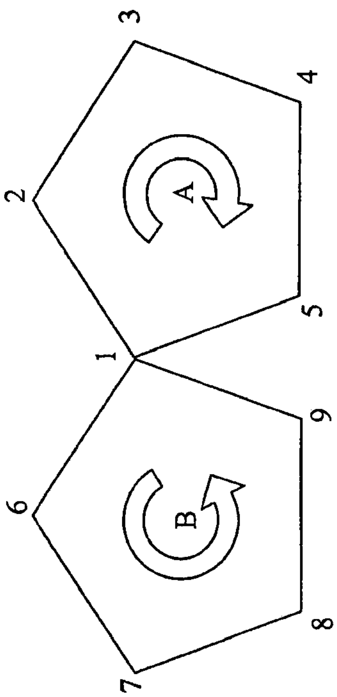
FIG. 3 is a schematic diagram illustrating an aircraft flight route.

Referring now to FIG. 2, according to an aspect of the present invention the engine operator may be warned in advance of an impending limit condition, so that the operator may governing usage of the engine accordingly such that occurrence of the limit condition is avoided or delayed. In particular, the invention permits one or more engine operating conditions to be monitored relative to selected threshold(s) to determine when warning flag(s) should be set and the operator warned accordingly. It will be understood that, in the context of this application, the "impending-at limit" condition indicates that an "at-limit" condition has not yet been reached, such that continued operation of the engine is still permitted before a next maintenance (etc.) operation is required. The "at-limit" condition is intended to refer to a condition at which an engine can or should no longer be operated, and at which maintenance, etc. is imminent or immediately required. Hence, the "impending-at limit" point is one that provides a operational margin between itself and the "at-limit" condition, such that the operator is provided with advance warning of the approaching at-limit condition, and provided with an opportunity (and typically also advice as to how) to operate the engine within the associated margin and thereby delay and/or more conveniently schedule the upcoming maintenance operation. In this application, the term "maintenance operation" is intended to refer to any maintenance, inspection, cleaning, repair, etc. operation which may require return of the engine/aircraft to a maintenance station and/or takes the engine out of service for more than a nominal period of time.

In this embodiment, a predetermined reference point for the engine exhaust gas temperature (EGT) parameter determines the point above which the APU control system must begin to adjust IGV angle to maintain electrical priority. Then, a reference parameter to be monitored is selected (step 20), in this case IGV angle. The reference parameter is representative of, or directly indicative of, the parameter to be trended, in this case EGT. An "at-limit" point is selected (step 21) and is typically the point at which the engine is deteriorated sufficiently that it can no longer be safely or properly operated, and therefore requires maintenance. According to the invention, a "warn" point is also selected (step 22), which is not equal to the "at-limit" point, but which is usually less than the "at-limit" point, and is selected to provide a margin between itself and the at-limit point, as will be described further below. As the effect of temperature and APU deterioration progress, the IGV angle is monitored (step 23) for a difference between IGV angle scheduled and IGV angle requested (this difference being referred to here as a "delta" for convenience). The existence of an IGV delta of course indicates that the reference EGT has been exceeded. Based on the delta, a counter is adjusted (step 24). The counter thus records ongoing exceedances and non-exceedances of the reference point.

When delta is present, the counter is preferably incremented by an amount, and when there is no delta, the counter is preferably decremented an amount (step 24). The amount by which the counter is incremented or decremented is preferably variable depending on the magnitude of the delta. Preferably, the increment/decrement values are selected to reflect an actual rate of deterioration of the APU so that flagging of an engine indication occurs as accurately as possible. Preferably, the magnitude of the delta is used to determine which of a pre-selected range of count factors of different magnitudes is appropriate to use in adjusting the counter. Incrementing the counter is preferably indicative of engine deterioration resulting from operating in a hot ambient condition, whereas decrementing the counter is preferably indicative of engine deterioration resulting from operating in a cooler ambient condition. As no operating environment is typically regenerative of an engine condition, preferably, the counter cannot be decremented below 0.

As mentioned, in the present embodiment, the counter is incremented in hotter environments where the EGT reference point is achieved (i.e., an IGV delta exists), and the counter is decremented in cooler environments where the EGT reference point is not achieved (i.e., there is no IGV delta). As the aircraft flies from airport to airport, conducting a main engine start at warmer airports will cause the APU EGT to exceed the reference point, and the delta will be sensed and determined, and a corresponding count factor will be applied to the counter depending on the magnitude of the delta. When the aircraft subsequently flies to an airport where the ambient temperature is lower, during a subsequent main engine start a zero delta may be present, and thus the counter will be decremented by a selected amount. When the counter accumulates a count exceeding a pre-selected warning limit (step 25), a warning is provided to the operator (step 26). Such warning is preferably embodied by the setting of a logic flag, indicative of the warning, set by the system executing the present invention.

Once the flag is set, a warning is provided to the operator indicating that an impending operational limit is approaching for main engine starts by the APU. Upon receiving such warning, the operator may be instructed (step 28) to take an associated maintenance action, review engine monitoring data to determine what maintenance action is recommended, and/or other step, and may be advised how the engine may be operated prior to scheduling the eventual maintenance action. Additionally, and perhaps more importantly, however, the operator will be able to extend (or shorten, or otherwise alter) the period of operation of the APU until a more convenient scheduled maintenance action can be undertaken by selecting cooler operating environments for the aircraft, thereby consciously and somewhat controllably delaying further deterioration of the APU pneumatic capability preferably by routing the aircraft to airports having cooler ambient temperature which will permit APU operation below the reference point. The invention may be further demonstrated with reference to Example A now following.

EXAMPLE A

The engine EGT reference point is 641° C., above which IGV angle will be reduced by the APU control system to give preference to the electrical load on the APU. According to the invention, the IGV angle is monitored for a delta between the IGV angle scheduled and the IGV angle requested, and the counter increment/decrement values are selected as shown in Table 1. The counter limit is set at +15, at which time the warning flag is set. As aircraft flies the route indicated in FIG. 3, and the ambient conditions are experienced, and corresponding counter values are established, as set out in Table 2.

The continued and repeated exposure of the aircraft to condition on Loop A and Loop B would allow the APU to continue main engine start operation for 2.25 cycles before a maximum counter value of 15 is reached, at which time the warning flag "Impending—APU at Limit" would be set accordingly. Upon receiving such flag, the operator may then elect to schedule a maintenance task and/or to defer maintenance based on the result of the engine maintenance manual guidance (i.e., associated to the warning flag set) to review the engine trend monitoring analysis. Maintenance may be deferred by selectively controlling future operation of the engine. For example, the operator may elect to fly this aircraft only to Airports 1, 2, 5 and 6, where ambient temperatures are sufficiently cool to permit engine EGT to be maintained below the reference point of 641° C., and thereby kept out (i.e., if aircraft scheduling permits) of an environment in which a reduced IGV angle will negatively impacting the main engine start pressure and flow to the aircraft main engines.

TABLE 1

| IGV Angle Delta (°) | Count factor |
|---|---|
| 0 | −1 |
| 0 to +2 | +1 |
| +2 to +5 | +2 |
| +5 to +10 | +3 |

TABLE 2

| Airport | IGV Angle Delta (°) | Counter Value |
|---|---|---|
| 1 | 0 | 0 |
| 2 | 0 | 0 |
| 3 | +10 | 3 |
| 4 | +2 | 4 |
| 5 | 0 | 3 |
| 1 | 0 | 2 |
| 6 | 0 | 1 |
| 7 | +10 | 4 |
| 8 | +10 | 7 |
| 9 | +2 | 8 |
| 1 | 0 | 7 |

Preferably the counter is decremented upon encountering less harsh environments (relative to the reference point, to thereby provide a sort of averaging of the combined cumulative effects of engine operation at both the harsher and less harsh environments.

Operation of the counter may be selectively started and ceased, depending on the intended condition to be measured. For example, in the described embodiment, the accumulation of counts is only permitted when the outside ambient temperature is within the approved APU operating envelope, the aircraft is on the ground and a main engine start is commanded.

Preferably, the operating parameter selected for comparison against the reference point is sampled such that a reading indicative of a steady state for the parameter is acquired for comparison, rather than a transient value which may not be representative of the parameters true current value. For example, in the above embodiment, the IGV angle is preferably sampled when the IGV position has stabilized after initial movement, to avoid reading a transient angle which is higher than the steady state value.

Preferably, the system incorporating the present invention will include an ability to offset or trim the reference point by a selected amount, which will allow the system to be trimmed in use to a new reference point which is determined to better reflect the actual deterioration of the engine in the circumstances.

The present invention provides, in one aspect, a means of reminding or indicating to the operator to review their engine monitoring data while there is still an amount of margin remaining for preferred or permitted operation before maintenance is required. This permits at-limit shutdowns of the engine to be avoided by providing the operator with advance notice of a deteriorated condition and the impending approach of one or more limit conditions.

In another aspect, upon receiving the warning, the operator may be advised as to how the engine may be operated (e.g. a desired aircraft route selected) to decelerate the rate at which engine operation deteriorates by selecting a desired environment for future operation prior to next required maintenance. This also permits the operator to be warned such that continued exposure to a less harsh (i.e., more favorable) environment will permit the operator to operate the engine for a longer period of time before maintenance is required than would be otherwise possible if the engine continued to be operated in harsher environments. This permits the operator to obtain maximum use of equipment before maintenance is required, thereby giving a fleet operator the ability to maximize productivity and/or revenue generation for each such aircraft.

In a revision of the above embodiment, rather than (or in addition to) monitoring IGV angle, EGT may be monitored directly or through other engine parameters such as gas generator speed, for example. Other engine parameters may also provide a proxy for measuring EGT.

In another embodiment, the present invention may be applied to a prime mover or auxiliary power gas turbine with reference to the monitoring of other operational limits of the engine or a line replaceable unit (LRU).

In another embodiment, the invention is applied to a prime mover gas turbine engine to trend the gas turbine exhaust gas temperature (commonly referred to as "T6") against a computed take-off T6 for the take-off condition for a control system that is closed-loop on output torque or power turbine shaft speed. A predetermined reference point is computed for the T6 parameter for a take-off condition based on ambient pressure and temperature. When engine take-off torque (for a closed-loop-on-torque system) or speed (for a closed-loop-on-power turbine speed system) is set for ambient conditions then T6 is monitored for a difference/delta between the actual T6 provided by the engine in the present ambient conditions and the computed take-off T6 provided from a look-up table stored in the electronic engine control. (As the skilled reader will understand, for a given output torque or turbine shaft speed, the T6 will rise over time as the engine deteriorates between maintenance operations). The existence of a delta between actual and computed take-off T6 indicates that the computed T6 has been exceeded. The amount of the delta is then used to determine the count factors to be applied to the counter. When the counter reaches a predetermined limit, an "Impending—Engine At Limit" flag is set, and the operator is advised by fault code through the engine maintenance manual to check the engine trend monitoring data to assess what maintenance needs to be scheduled for the engine, and/or how future operation of the engine may be varied (e.g. by operating the aircraft in a cooler region if possible within the operator's operational region) to thereby assist the operator in improving the management of scheduled maintenance for their fleet.

In further embodiments, shaft speeds, interturbine temperatures, or other operating parameters may be monitored and exceedances/nonexceedances of a reference limit counted to warn the operator of an impending limit condition indicative of compressor performance deterioration, for example, or other engine deterioration condition.

Figure 4:
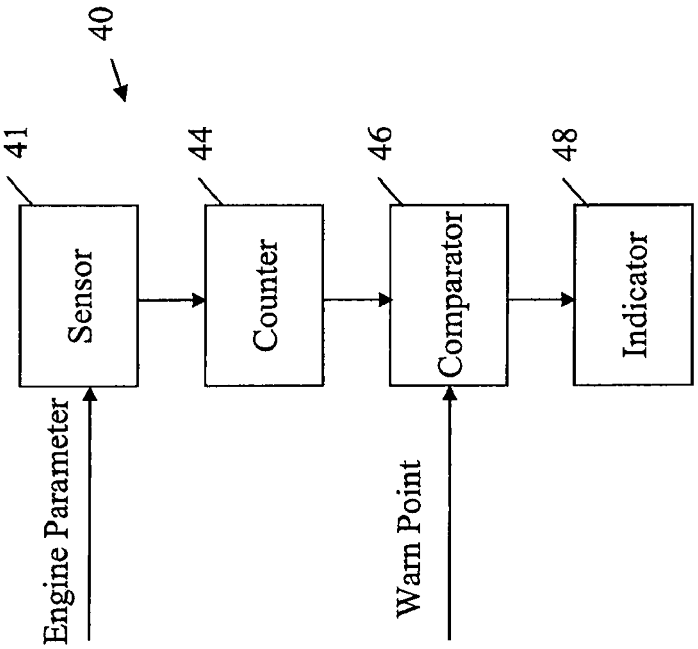
FIG. 4 is a block diagram of a system according to an embodiment of the present invention.

Now referring to FIG. 4, an embodiment of the invention includes a system 40 for monitoring the performance of an aircraft-mounted gas turbine engine. System 40 comprises a sensor 41, a counter 44, a comparator 46 and an indicator 48. Sensor 41 monitors an engine parameter and detects a difference in the engine parameter between an actual value and an expected value. Counter 44 is then used to keep track of a counter value based on engine parameter actual-expected difference sensed. Comparator 46 then compares the counter value to a warn point corresponding to an at-limit point which in turn corresponds to the engine parameter. The warn point is different than the at-limit point. Comparator 46 also sets a warning flag indicative of an impending maintenance condition when the counter value meets at least a first criterion based on the comparison. Finally, indicator 48 advises an operator of the aircraft that the warning flag has been set.

Figure 5:
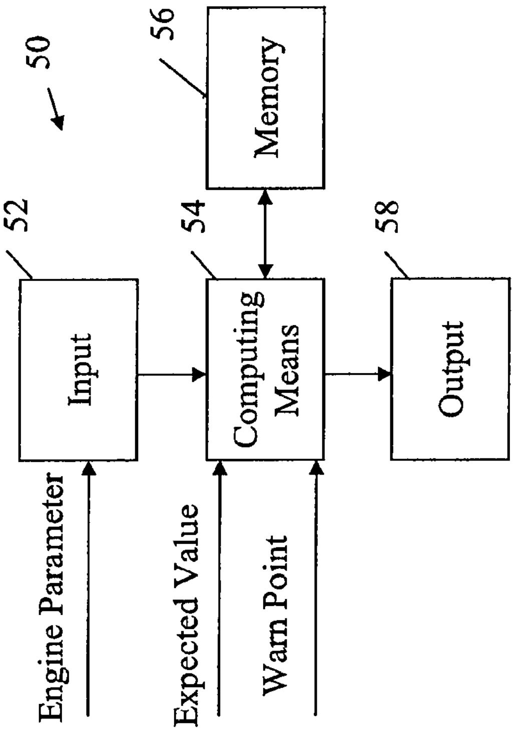
FIG. 5 is a block diagram of an apparatus according to an embodiment of the present invention.

Now referring to FIG. 5, an embodiment of the invention includes an apparatus 50 for monitoring the performance of an aircraft-mounted gas turbine engine. Apparatus 50 includes an input 52, a computing means 54, a memory 56 and an output 58. Input 52 receives an engine parameter and forwards it to computing means 54. Computing means 54 detects a difference in the engine parameter between an actual value and an expected value. Memory 56 is used to keep track of a counter value based on engine parameter actual-expected difference sensed. Computing means 54 further compares the counter value to a warn point corresponding to an at-limit point corresponding to the engine parameter. The warn point is different than the at-limit point. Computer 54 also sets a warning flag indicative of an impending maintenance condition when the counter value meets at least a first criterion based on the comparison. Finally output 58 indicates to an operator of the aircraft that the warning flag has been set.

While FIGS. 4 and 5 illustrate block diagrams as groups of discrete components communicating with each other via distinct data signal connections, it will be understood by those skilled in the art that the invention may be provided by any suitable combination of hardware and software components, with some components being implemented by a given function or operation of a hardware or software system, and many of the data paths illustrated being implemented by data communication within a computer application or operating system. The structure illustrated is thus provided for efficiency of teaching the functional aspects of the invention, it being understood that the manner in which the functional elements may be embodied is diverse. In many instances, one line of communication or one associated device is shown for simplicity in teaching, when in practice many of such elements are likely to be present.

It will therefore be understood that numerous modifications to the described embodiment will be apparent to those skilled in the art which do not depart from the scope of the invention described herein. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method of monitoring the performance of an aircraft-mounted auxiliary power unit having adjustable inlet guide vanes, the method comprising:

determining whether a reference exhaust gas temperature of the auxiliary power unit has been achieved by monitoring a difference between an inlet guide vane angle scheduled and an inlet guide vane angle requested;

selecting a count factor based on the magnitude of the monitored difference between the inlet guide vane angle scheduled and the inlet guide vane angle requested;

incrementing or decrementing a counter by the selected count factor;

comparing the counter against a predetermined threshold condition, the threshold condition being different from an at-limit condition, the reaching of the predetermined threshold condition by the counter being indicative of deteriorating performance of the auxiliary power unit and providing an operational margin within which continued operation of the auxiliary power unit is still permitted prior to a next related maintenance operation; and conditioned upon the predetermined threshold condition being reached, advising an operator of the aircraft to select a future operating plan for the aircraft suitable for continued operation of the auxiliary power unit within the operational margin.

2. The method of claim 1, including advising the operator to select a destination having an ambient condition more favorable to continued operation of the auxiliary power unit than an otherwise-intended destination.

3. The method of claim 2, wherein the ambient condition comprises at least one of temperature and pressure.

4. The method of claim 3, wherein the temperature comprises a ground temperature at an airport at which the auxiliary power unit is operated.

5. The method of claim 4, including advising the operator to select a destination having a ground temperature more favorable to continued operation of the auxiliary power unit than an otherwise-intended destination.

6. A method of extending operation of an aircraft-mounted auxiliary power unit having adjustable inlet guide vanes, the method comprising:

determining whether a reference exhaust gas temperature of the auxiliary power unit has been achieved by monitoring a difference between an inlet guide vane angle scheduled and an inlet guide vane angle requested;

selecting a count factor based on the magnitude of the monitored difference between the inlet guide vane angle scheduled and the inlet guide vane angle requested;

incrementing or decrementing a counter by the selected count factor; and conditioned upon a predetermined counter value being reached, advising an operator to select a future flight plan for the aircraft suitable to extend a permissible operation period of the auxiliary power unit before a next maintenance event of the auxiliary power unit is required.

7. The method of claim 6, wherein the flight plan provides an operating environment expected to have an airport ground temperature below a predetermined temperature value.

* * * * *